United States Patent [19]
Frattarola et al.

[11] Patent Number: 5,611,654
[45] Date of Patent: Mar. 18, 1997

[54] CAPTIVE NUT

[75] Inventors: Albert J. Frattarola, Swarthmore; Kevin P. Lavalley, Parkside, both of Pa.

[73] Assignee: Southco, Inc., Concordville, Pa.

[21] Appl. No.: 510,543

[22] Filed: Aug. 2, 1995

[51] Int. Cl.⁶ ................................................. F16B 37/08
[52] U.S. Cl. ........................ 411/432; 411/173; 411/353; 411/999
[58] Field of Search ................................. 411/432, 433, 411/427, 999, 970, 353, 352, 153, 177, 176, 173

[56] References Cited

U.S. PATENT DOCUMENTS

| | | | |
|---|---|---|---|
| 2,151,255 | 3/1939 | Witchger | 411/427 |
| 2,464,133 | 3/1949 | Herbert | 411/432 |
| 5,042,880 | 8/1991 | Garuti | 411/999 |
| 5,056,974 | 10/1991 | Dolin | 411/352 |
| 5,382,124 | 1/1995 | Frattarola | 411/352 |

FOREIGN PATENT DOCUMENTS

| | | | |
|---|---|---|---|
| 825877 | 12/1959 | United Kingdom | 411/427 |
| 1579730 | 11/1980 | United Kingdom | 411/153 |

OTHER PUBLICATIONS

Southco, Inc., Southco Latches and Access Hardware Handbook 45 NA, pp. C1–C44, (Pennsylvania, 1995).

*Primary Examiner*—Flemming Saether
*Attorney, Agent, or Firm*—Paul & Paul

[57] ABSTRACT

A captive nut having a knob, rotatable about a central longitudinal axis, the knob having an internally threaded longitudinal hole extending at least partially through the knob and a means to facilitate rotation of the knob. Also included is a hollow ferrule having a panel attachment means for attachment of the ferrule to a panel, and a knob captivation means wherein the knob is slidably and rotatably attached to an end of the ferrule such that when the nut is in a fully retracted position, the knob captivation means prevents the ferrule and the knob from separating.

23 Claims, 6 Drawing Sheets

CAPTIVE NUT

BACKGROUND OF THE INVENTION

This invention relates to a captive nut of a type used to attach a first panel containing one or more captive nuts to a second panel or frame having a like number of screws, threaded shafts, or the like, protruding from the second panel. In various situations, for example, in the fields of electronics or aviation, it is desirable to keep fasteners in position without loose items of hardware. Each captive nut is mounted on the first panel such that each nut stays attached to the first panel even when the nut threads are fully disengaged from the second panel containing a threaded shaft to which the upper panel is attached.

The present invention is directed toward a captive nut which has a low profile, and may have various panel attachment means. These panel attachment means may include snap-in means (requiring no tools for installation), press-in means (for various panel materials including fiberglass, metals, and the like), flare-in means, and the like. When the captive nut is disengaged from the threaded shaft to which it has been attached, the upper knob section of the captive screw is biased upward such that the threads of the nut remain clear of the threads of the corresponding screw, threaded shaft, or the like.

Prior to the present invention, there have been a variety of captive screws wherein a screw is captivated on an upper panel that mates with a threaded hole in a lower panel as shown, for example, in U.S. Pat. No. 5,382,124 to Frattarola.

SUMMARY OF THE INVENTION

This invention relates to a low profile, captive nut of a type for use when a first panel or other relatively thin, flat member is required to be mounted against a surface such as a that of a second panel or frame containing one or more screws, threaded shafts, or the like. Such screws, threaded shafts, or the like are mounted on the second panel or frame such that the longitudinal axis of each screw, threaded shaft or the like coincides with the axis of each captive nut used.

In operation, typically the panels are brought together with the bottom surface of the upper panel flush with the top surface of the lower panel. Mounted upon the top surface of the upper panel are one or more captive nuts. The lower panel contains a like number of threaded rods, protruding screws, or the like in corresponding locations, such that when the two panels are brought together, each captive nut is attachable to a corresponding threaded rod, screw or the like. By rotating a knob portion containing an internally threaded hole of the same screw size as that of the threaded rod, the upper and lower panels may be attached together. However, when separated, the captive nut remains attached to the upper panel so that the nuts will not be lost or misplaced.

In one preferred embodiment, the captive nut comprises a knob and a ferrule. The knob is rotatable about a central longitudinal axis, having an internally threaded longitudinal hole extending at least partially through the central longitudinal axis of the knob, and a means to facilitate rotation. The ferrule is substantially hollow and has a panel attachment means for attachment of the ferrule to a panel. The captive nut also has a knob captivation means such that the ferrule is slidably and rotatably attached to the knob. When the nut is in a fully retracted position, the knob captivation means prevents the ferrule and the knob from separating.

BRIEF DESCRIPTION OF THE DRAWINGS

FIG. 14 is a side elevation view of an insert used in the screws of FIGS. 11 and 11a through 13 and 13a.

DESCRIPTION OF THE PREFERRED EMBODIMENT

Referring now in detail to the drawings, wherein like reference numerals indicate like elements throughout the several views, there is shown in FIGS. 1 through 4 a captive nut 10 in accordance with one preferred embodiment of the present invention. The illustrative device is shown generally comprising a generally cylindrical, partially hollow knob 20, a generally cylindrical, hollow ferrule 30, a spring 40 or other biasing means, and a knob captivation means 50. The knob captivation means 50 provides for slidable and rotatable attachment of the knob 20 to the ferrule 30 such that, when the captive nut 10 is in a fully retracted position, the knob captivation means 50 prevents the ferrule 30 and the knob 20 from separating.

Figure 1:
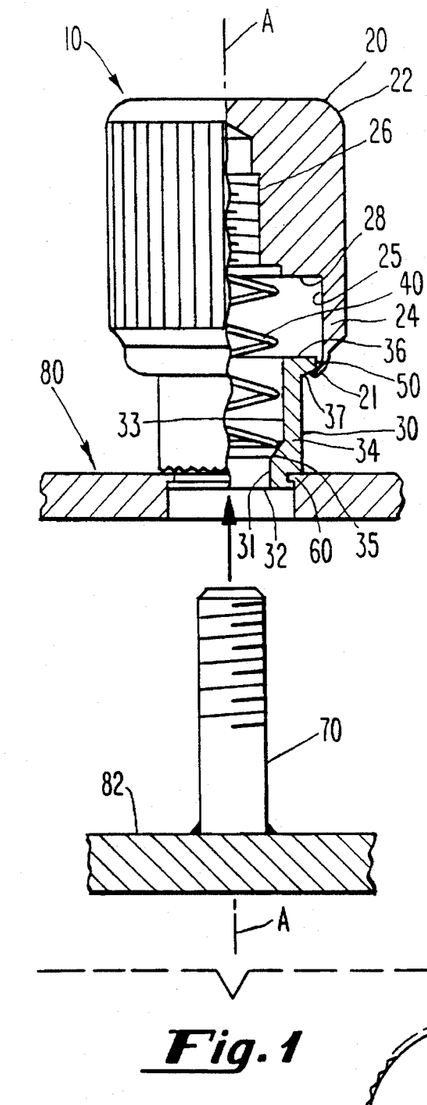
FIG. 1 is a side elevation view, partially cutaway, of a captive nut as installed on a first panel and prior to fastening to a second panel, depicted in an unfastened condition, embodying a first embodiment of the present invention.
Figure 3:
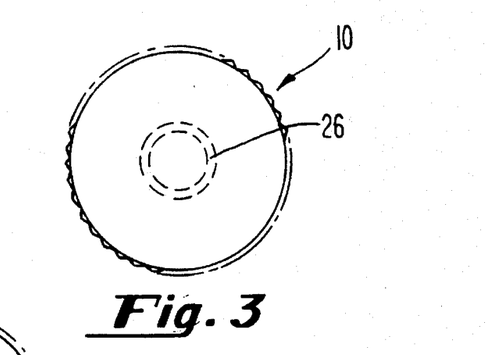
FIG. 3 is a top view of the captive nut of FIG. 1 depicting a captive nut having a closed end.
Figure 4:
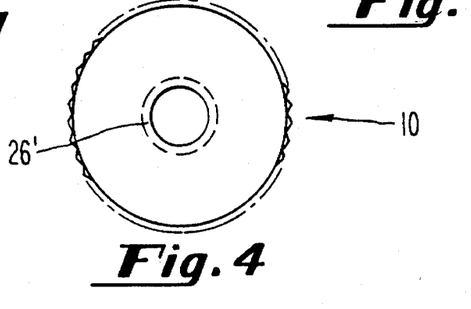
FIG. 4 is the top view of the captive nut of FIG. 2 depicting a captive nut having a threaded hole extending through the knob of the captive nut.

The generally cylindrical knob 20 has a substantially solid upper knob portion 22 and a substantially hollow lower knob 24 portion. The knob 20 is rotatable about its central axis A. As can be seen in FIGS. 1 and 3, an internally threaded hole 26 extends partially through the solid portion 22 of the knob 20 through the central axis A. Alternatively, a threaded hole 26' can extend fully through knob 20. Having hole 26' extend through knob 20 provides for a large range of screw or threaded rod lengths that can be accommodated when using the captive nut 10. This threaded hole 26 or 26' provides the "nut" for attachment to a threaded rod, screw, or the like 70.

Figure 2:
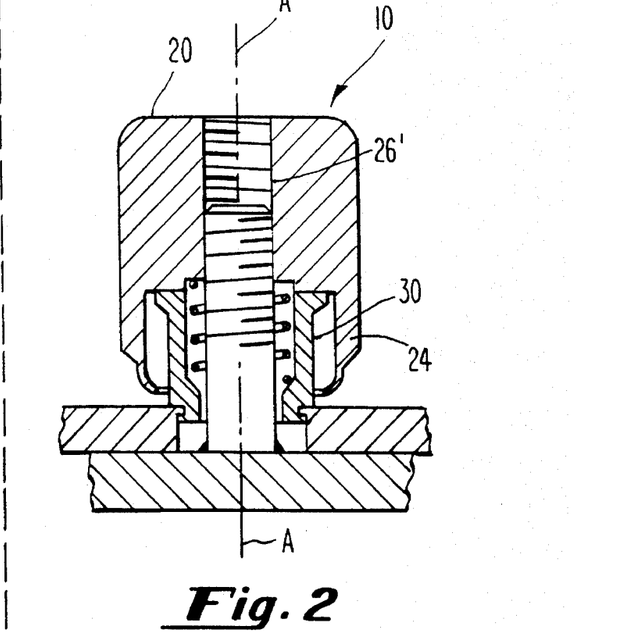
FIG. 2 is a side elevation, cutaway view of the captive nut of FIG. 1, depicted in a fastened condition, fastened to a threaded rod protruding from a second panel with an alternate nut thread which extends through the knob of the captive nut.

The substantially hollow lower knob portion 24 of the knob 20 provides for axial movement of the knob 20 which contains the internally threaded hole 26 or 26', such that the nut can be threaded down onto a threaded rod, screw or the like 70. The inside diameter of the hollow lower knob portion 24 is larger than the outside diameter of the main body 34 of the ferrule 30 as can be seen in FIGS. 1 and 2. The knob 20 thus has the ability to axially slide over the ferrule such that axial movement, generally equal in length to the axial length of the hollow lower knob portion 24 of the knob 20, is available.

In FIG. 1, an upper, first panel 80 is shown with a captive nut attached. FIG. 1 also shows a lower, second panel 82 containing a rigidly mounted threaded rod 70. This figure shows one example of two panels 80, 82 prior to attachment. FIG. 2 shows the two panels as attached. Note that, in FIG. 2, the knob 20 has traveled downward along axis A such that one end of the ferrule 30 is now in contact with a surface of the solid portion 22 of the knob 20.

Figure 14:
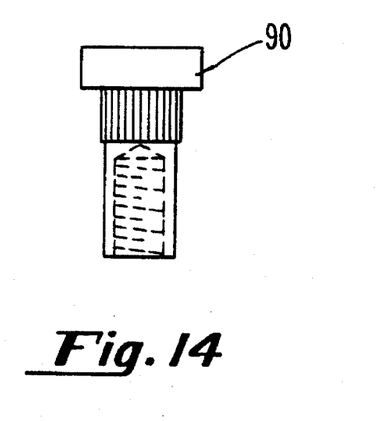
Figure 15:
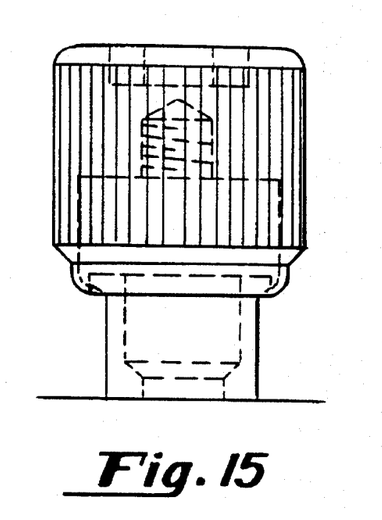
FIG. 15 is a side elevation view of a captive nut having a fourth alternative means to facilitate rotation having a slotted screw driver recess.
Figure 15A:
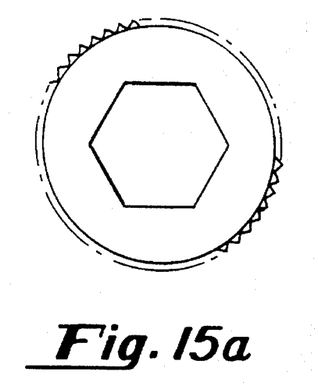
FIG. 15a is a top view thereof.
Figure 16:
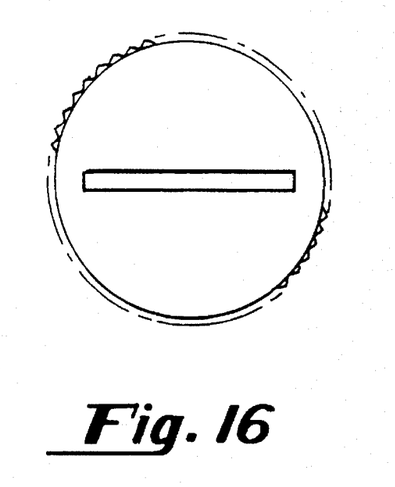
FIG. 16 is a side elevation view of a captive nut having a fifth alternative means to facilitate rotation having a slotted screwdriver recess.
Figure 16A:
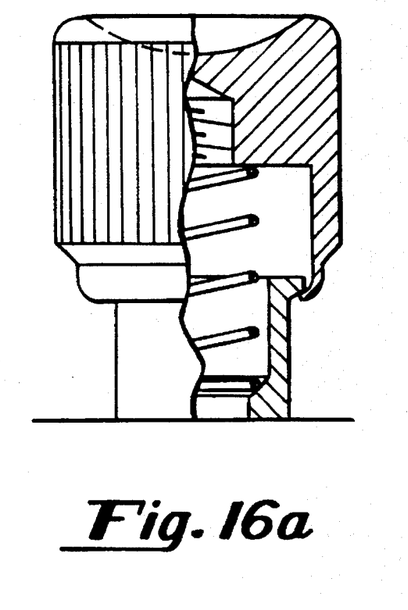
FIG. 16a is a top view thereof.
Figure 17:
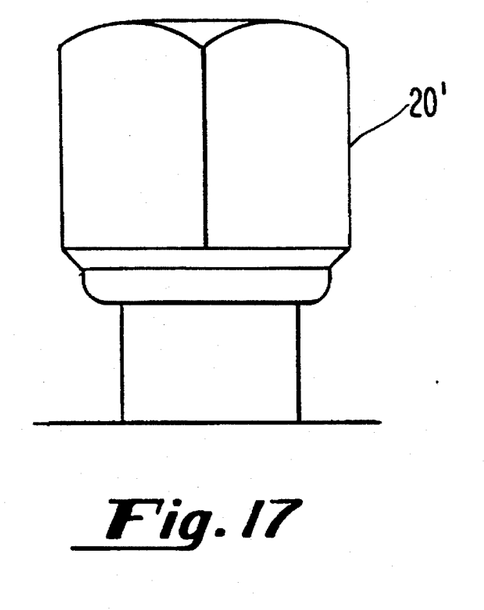
FIG. 17 is a side elevation view of a captive nut having an alternative hex-shaped knob, the hex shape for facilitating rotation of the knob.
Figure 17A:
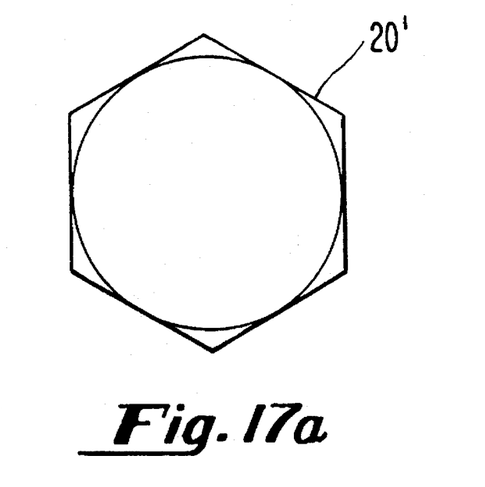
FIG. 17a is a top view thereof.

Optionally disposed on the outer circumference of the knob 20 are axially scored lines 34 to facilitate tightening of the nut 10 using only fingers without any tools, or to facilitate the initial alignment of the screw threads 26 with a threaded hole in the lower panel. Alternate embodiments may include a knurling pattern or other frictional surface. For example, FIGS. 11, 11a and FIGS. 16 and 16a depict captive nuts having a smooth knob, but with a recess for a slotted screwdriver. The captive nut of FIGS. 11 and 11a have a separate, pressed-in insert 90 (depicted in FIG. 14) that is internally threaded on one end and has the recess on the opposing end. Advantageously here, the knob 20 may be constructed of a different material than that of the insert 90. For example, the outer knob 20 may be aluminum, while the insert 90 may be steel such that the advantages of light weight, plus strong internal threads and screw head recess are provided. Likewise, FIGS. 12 and 12a, and FIGS. 13 and 13a depict similar designs using an insert 90, however, with an alternate hex insert and Phillips insert respectively. Alternatively, as shown in FIGS. 15 and 15a and 16 and 16a, a screw driver recess may be made be part of the knob 20 material itself. FIGS. 17 and 17a further depict a hex shaped knob 20', such that a standard wrench may be used.

The ferrule 30 has a first end 32 containing the panel attachment means 60, a main body 34, and a second end 36 containing a portion of the knob captivation means 50. As described above, the knob 20 is rotatably attached to the ferrule 30, however, full rotational movement of the knob with respect to the ferrule 30, and a limited amount of axial movement of the knob 20 with respect to the ferrule 30, corresponding approximately to the axial length of the hollow portion of the knob 20 combined with the axial length of the ferrule 30 are provided.

The axial movement of the knob 20 is limited by the knob captivation means 50 and by the axial length of the ferrule combined with the hollow portion of the knob 20 as described above and depicted in FIGS. 1 and 2. The knob captivation means 50 includes a first annular flange 21 on the knob extending inward from the inner surface 25 of the hollow knob 20 towards the central axis A of the knob 20, in combination with a second annular flange 37, integral to the ferrule 30, extending generally radially outward from the body of the ferrule 30 at the knob end or second end of the ferrule 30. The inside surface of the hollow portion 24 of the knob 20 has a larger diameter than the outside diameter of the main body 34 of the ferrule 30 such that a portion of the ferrule 30 is slidable within the hollow cylindrical body of the knob 20. As can be seen in FIG. 2, when the captive nut 10 is engaged, i.e. when two panels are rigidly connected by the captive nut 10, the second end of the ferrule 30 is fully inserted into the hollow cylindrical body of the knob 30. The first and second annular flanges 21 and 37 allow the knob 20 and the ferrule 30 to be a single non-detachable assembly, while allowing for axial movement of the knob 20 with respect to the ferrule 30.

Figure 5:
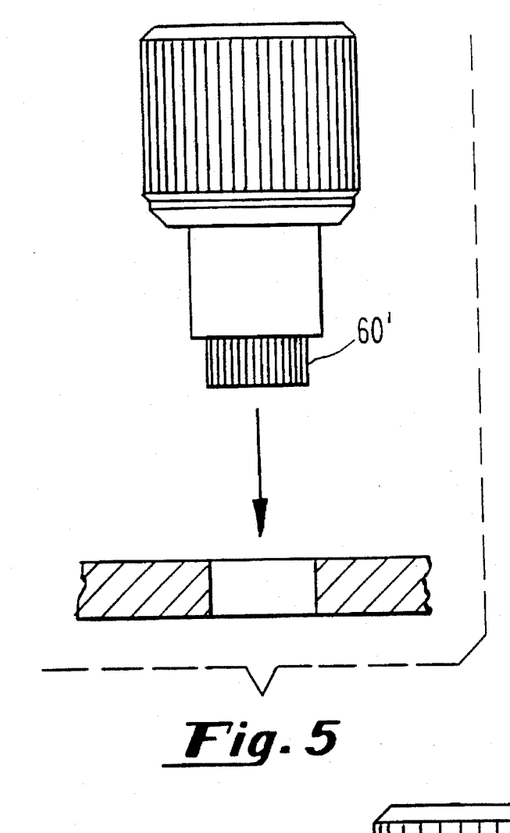
FIG. 5 is a side elevation view of a captive nut having an first alternative press-in panel mounting means, shown prior to installation on a first panel, embodying a second embodiment of the present invention.
Figure 6:
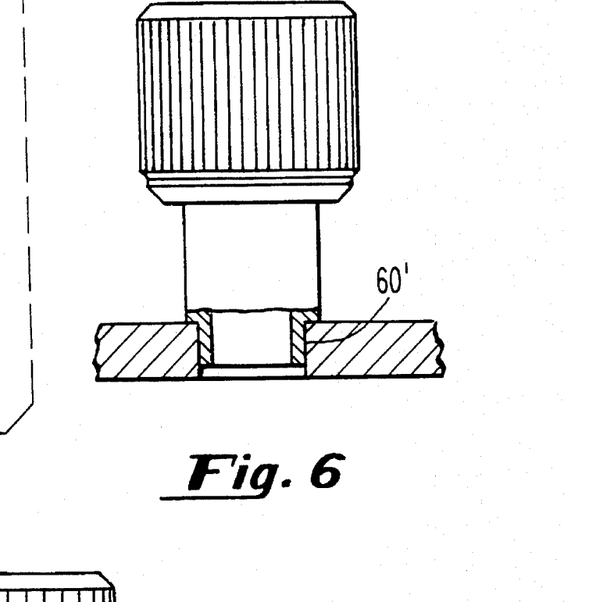
FIG. 6 is a side elevation view, partially cutaway, of the captive nut of FIG. 5, depicted in an unfastened condition, shown as installed on a panel.
Figure 7:
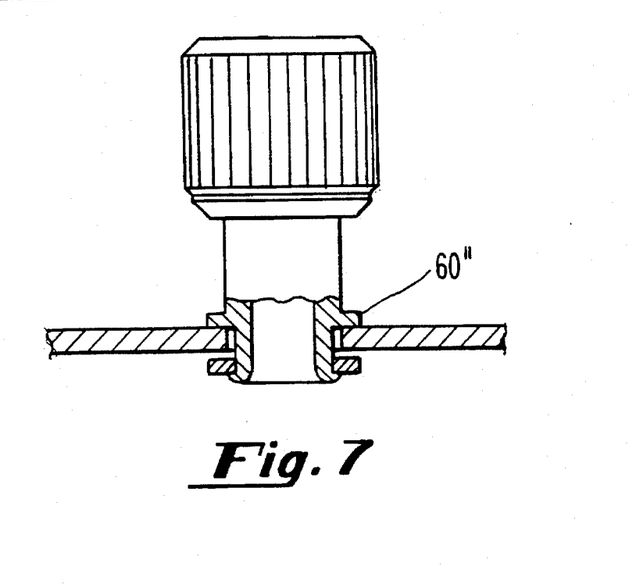
FIG. 7 is a side elevation view, partially cutaway, of a captive nut having a second alternative floating panel mounting means shown as installed on a panel, depicted in an unfastened condition, embodying a third embodiment of the present invention.
Figure 8:
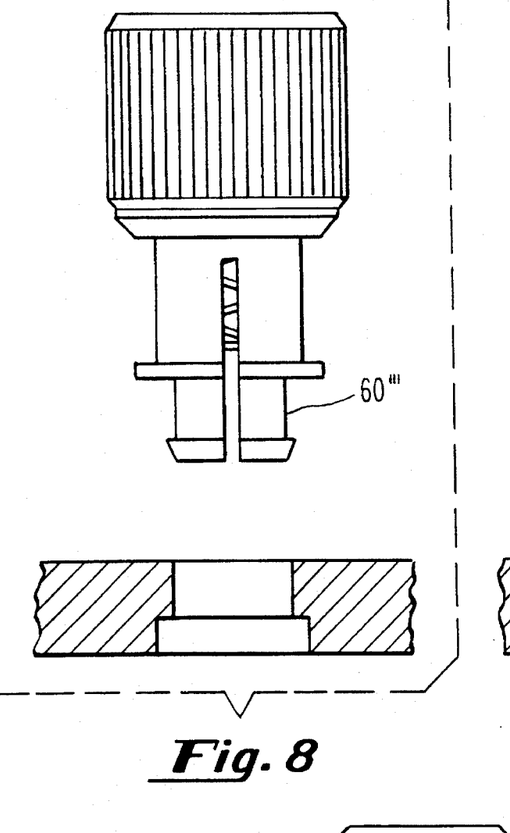
FIG. 8 is a side elevation view of a captive nut having a third alternative snap-in panel mounting means, shown prior to installation on a first panel, embodying a fourth embodiment of the present invention.
Figure 9:
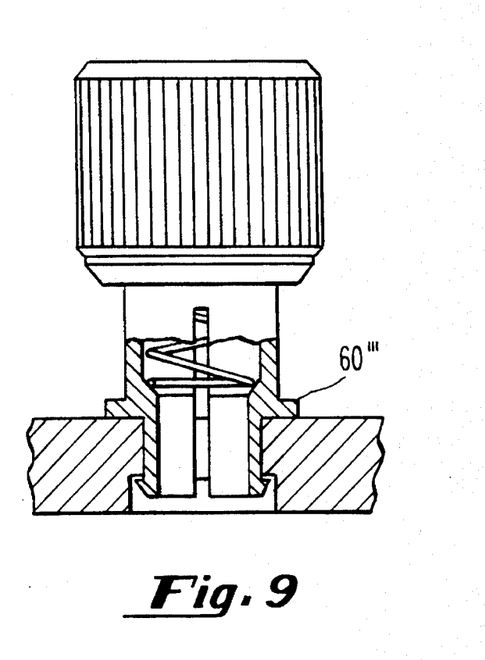
FIG. 9 is a side elevation, partially cutaway, view of the captive nut of FIG. 8, depicted as installed on a first panel.
Figure 10:
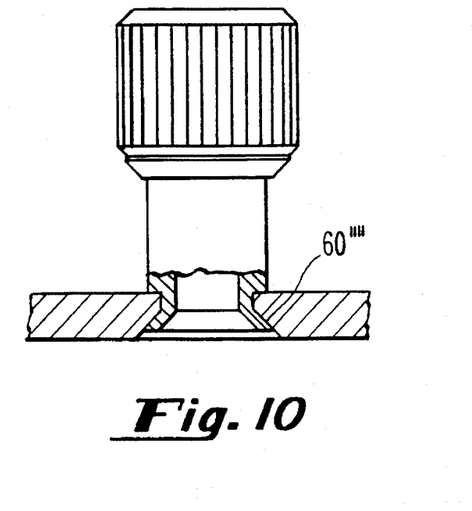
FIG. 10 is a side elevation, partially cutaway view of a captive nut having an fourth alternative flare-in panel mounting means, depicted as installed on a panel, embodying a fifth embodiment of the present invention.
Figure 11:
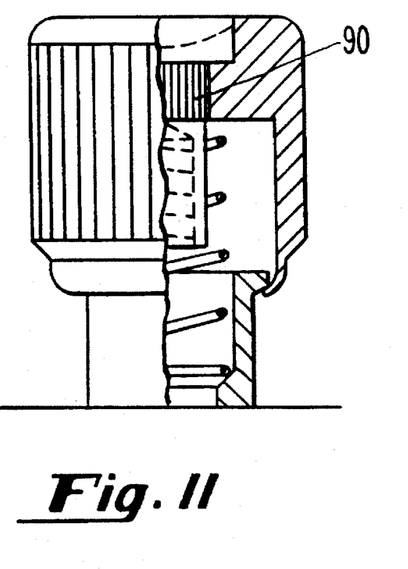
FIG. 11 is a side elevation, partially cutaway view of a captive nut having a first alternative means to facilitate rotation having a slotted screwdriver recess.
Figure 11A:
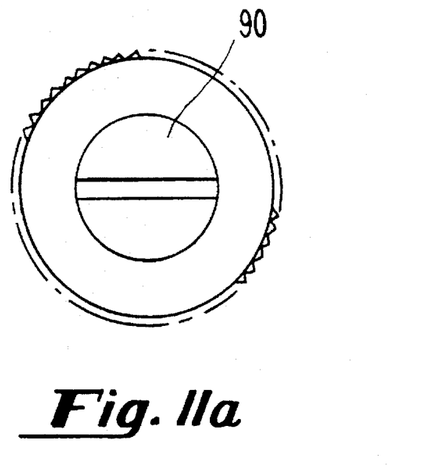
FIG. 11a is a top view thereof.
Figure 12:
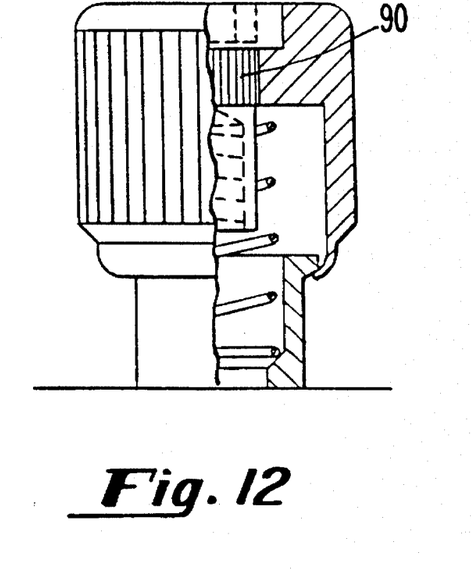
FIG. 12 is a side elevation, partially cutaway view of a captive nut having a second alternative means to facilitate rotation having a hex driver recess.
Figure 12A:
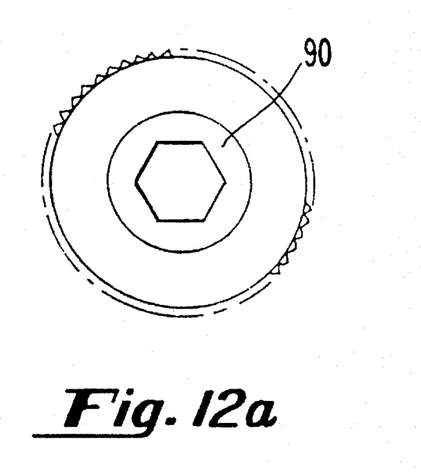
FIG. 12a is a top view thereof.
Figure 13:
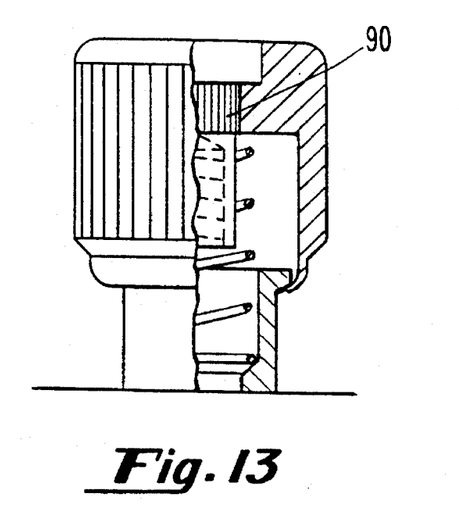
FIG. 13 is a side elevation, partially cutaway view of a captive nut having a third alternative means to facilitate rotation having a Phillips screwdriver recess.
Figure 13A:
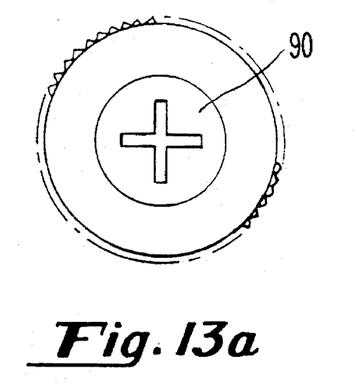
FIG. 13a —a to d view thereof.

At the end of the ferrule opposite the knob captivation means 50 is a panel attachment means 60. Such a panel attachment means 60 can be any known in the art, such as the press-in configuration 60 generally used for metals such as aluminum, steel, or the like as shown in FIGS. 1 and 2, the press-in configuration 60' generally used for fiberglass, printed circuit boards, or the like as shown in FIGS. 5 and 6, the floating panel configuration 60" as shown in FIG. 7 for use when greater tolerances are desired for locating the nut on the panel, the snap-in configuration 60''' as shown in FIGS. 8 and 9 (see U.S. Pat. No. 5,382,124) and the flare-in configuration 60'''' as shown in FIG. 10.

Optionally, encased between the ferrule 30 and the knob 20 is spring 40. Ferrule 30 preferably has a two stage internal diameter: a lower internal diameter 31 and an upper internal diameter 33. The lower internal diameter 31 allows clearance for threaded shaft 70 while the upper internal diameter 33 has an internal diameter large enough to accommodate the threaded shaft 70 with spring 40 surrounding it. The annular ledge 35 created with the two different internal diameters 31 and 33 serves to function as a termination point for one end of spring 40. The opposite end of spring 40 is terminated at the under side 28 of the solid portion 22 of knob 20. When the spring 40 is in its most uncompressed position, the knob 20 is at its most retracted position, i.e. the annular flanges 21 and 37 are in contact with each other. Here, the knob 20 is fully retracted. The spring 40 provides for retraction of the knob 20, and thus the threaded hole 26 or nut portion of the knob away from top surface of the panel 80 to which the captive nut 10 is attached. Thus, advantageously, it can easily be seen whether a captive nut is secured or not secured when a first panel 80 is attached to a second panel 82 by observing the height of the knob 20 of the captive nut 10. Additionally, the travel of the knob 20 relative to the ferrule 30 allows for the two panels 80, 82 to be placed flush against one another prior to the clamping down of the nut 10, assuming the proper length threaded rod or screw 70 is selected.

It will be recognized by those skilled in the art that changes may be made in the above described embodiments of the invention without departing from the broad inventive concepts thereof. It is understood, therefore, that this invention is not limited to the particular embodiments disclosed, but is intended to cover all modifications which are within the scope and spirit of the invention as defined by the appended claims.

We claim:

1. A captive nut comprising:
   a. a knob, rotatable and moveable axially about a central longitudinal axis of said knob, comprising:
      i. an internally threaded longitudinal hole extending at least partially through said central longitudinal axis of said knob;
      ii. means to facilitate rotation;
   b. a substantially hollow ferrule comprising a first end and a second end, said first end having a panel attachment means for attachment of said ferrule to a panel; and
   c. a knob captivation means wherein said knob is slidably and rotatably attached to said second end of said ferrule such that when said nut is in a fully retracted position, said knob cativation means prevents said ferrule and said knob from separating.

2. The captive nut of claim 1, wherein said internally threaded, longitudinal hole in said knob extends through said knob.

3. The captive nut of claim 1, wherein said means to facilitate rotation of said knob is a knurling pattern on the knob.

4. The captive nut of claim 1, wherein said means to facilitate rotation of said knob is a screwdriver recess.

5. The captive nut of claim 1, wherein said means to facilitate rotation of said knob is the knob constructed in a hex-shape.

6. The captive nut of claim 1, wherein said panel attachment means comprises a snap-in configuration.

7. The captive nut of claim 1, wherein said panel attachment means comprises a flare-in configuration.

8. The captive nut of claim 1, wherein said panel attachment means comprises a press-in configuration.

9. The captive nut of claim 1, wherein said panel attachment means comprises a floating panel configuration.

10. A captive nut comprising:
    a. a knob, rotatable and moveable axially about a central longitudinal axis of said knob, comprising:
       i. an internally threaded longitudinal hole extending at least partially through said central longitudinal axis of said knob;
       ii. means to facilitate rotation;
    b. a substantially hollow ferrule comprising a first end and a second end, said first end having a panel attachment means for attachment of said ferrule to a panel; and
    c. a knob captivation means wherein said knob is slidably and rotatably attached to said second end of said ferrule such that when said nut is in a fully retracted position, said knob captivation means prevents said ferrule and said knob from separating; and
    d. a biasing means, extending between an internal ledge in said ferrule and an internal surface in said knob, that biases said knob axially to a fully retracted position when no axial load is applied to said knob.

11. The captive nut of claim 10, wherein said biasing means is a helical spring.

12. A captive nut, mountable to a first panel for attachment to a threaded rod protruding from a second panel, comprising:
    a. a knob, rotatable and moveable axially about a central longitudinal axis of said knob, comprising:
       i. a substantially solid upper knob portion and a substantially hollow lower knob portion;
       ii. an internally threaded longitudinal hole extending at least partially through said central longitudinal axis of said upper knob portion of said knob;
       iii. means to facilitate rotation;
    b. a substantially hollow ferrule comprising a first end and a second end, said first end having a panel attachment means for attachment of said ferrule to a panel; and
    c. a knob captivation means wherein said substantially hollow lower knob portion is slidably and rotatably attached to said second end of said ferrule such that, when said nut is in a fully retracted position, said knob captivation means prevents said ferrule and said knob from separating.

13. The captive nut of claim 12, wherein said internally threaded, longitudinal hole in said knob extends through said knob.

14. The captive nut of claim 12, wherein said means to facilitate rotation of said knob is a knurling pattern on the knob.

15. The captive nut of claim 12, wherein said means to facilitate rotation of said knob is a screwdriver recess.

16. The captive nut of claim 12, wherein said means to facilitate rotation of said knob shaft is the knob constructed in a hex-shape.

17. The captive nut of claim 12, wherein said panel attachment means comprises a snap-in configuration.

18. The captive nut of claim 12, wherein said panel attachment means comprises a flare-in configuration.

19. The captive nut of claim 12, wherein said panel attachment means comprises a press-in configuration.

20. The captive nut of claim 12, wherein said panel attachment means comprises a floating panel configuration.

21. A captive nut, mountable to a first panel for attachment to a threaded rod protruding from a second panel, comprising:
    a. a knob, rotatable and moveable axially about a central longitudinal axis of said knob, comprising:
       i. a substantially solid upper knob portion and a substantially hollow lower knob portion;
       ii. an internally threaded longitudinal hole extending at least partially through said central longitudinal axis of said upper knob portion of said knob;
       iii. means to facilitate rotation;
    b. a substantially hollow ferrule comprising a first end and a second end, said first end having a panel attachment means for attachment of said ferrule to a panel;
    c. a knob captivation means wherein said substantially hollow lower knob is slidably and rotatably attached to said second end Of said ferrule such that, when said nut is in a fully retracted position, said knob captivation means prevents said ferrule and said knob from separating; and
    d. a biasing means, extending between an internal ledge in said ferrule and an internal surface in said knob, that biases said knob axially to a fully retracted position when no axial load is applied to said knob.

22. The captive nut of claim 21, wherein said biasing means is a helical spring.

23. A captive nut, mountable to a first panel for attachment to a threaded rod protruding from a second panel, comprising:
 a. a knob, rotatable and moveable axially about a central longitudinal axis of said knob, comprising:
  i. a substantially solid upper knob portion and a substantially hollow lower knob portion;
  ii. an internally threaded longitudinal hole extending at least partially through said central longitudinal axis of said upper knob portion of said knob;
  iii. means to facilitate rotation;
 b. a substantially hollow ferrule comprising a first end and a second end, said first end having a panel attachment means for attachment of said ferrule to a panel;
 c. a knob captivation means wherein said substantially hollow lower knob portion is slidably and rotatably attached to said second end of said ferrule such that, when said nut is in a fully retracted position, said knob captivation means prevents said ferrule and said knob from separating; and
 d. a spring, extending between an internal ledge in said ferrule and an internal surface in said knob, that biases said knob axially to a fully retracted position when no axial load is applied to said knob.

* * * * *